C. W. STEELE.
TREAD FORMING PRESS.
APPLICATION FILED MAY 27, 1918.

1,291,227.

Patented Jan. 14, 1919.
3 SHEETS—SHEET 1.

WITNESS

INVENTOR.
Charles W. Steele
BY G. L. Ely
ATTORNEY

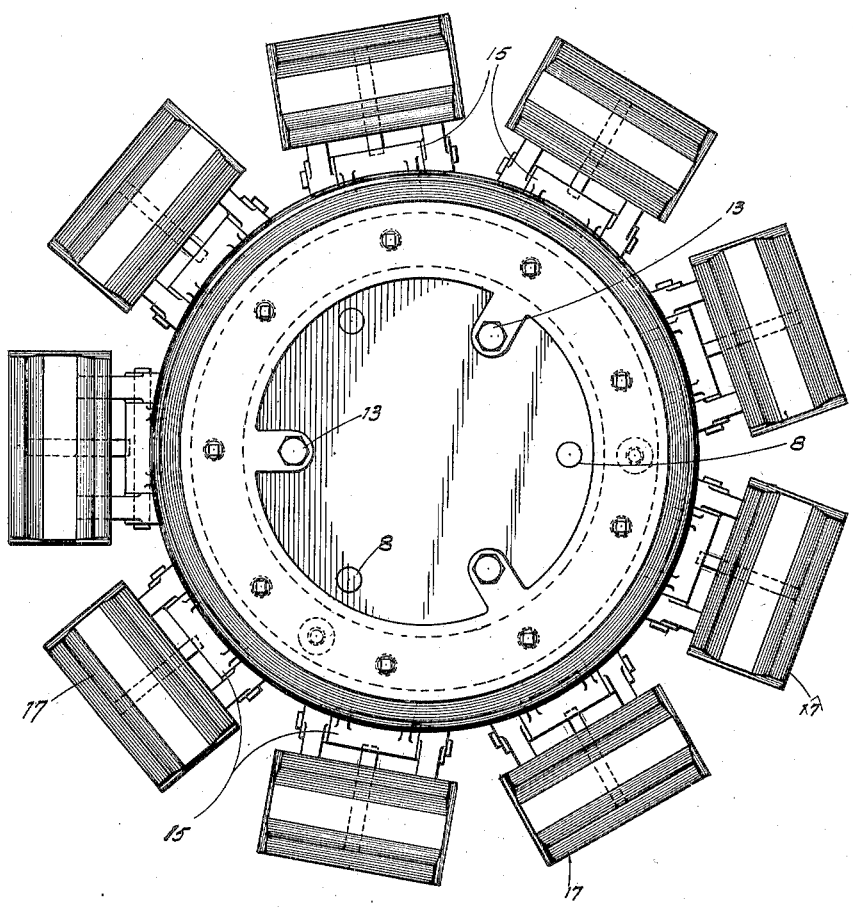

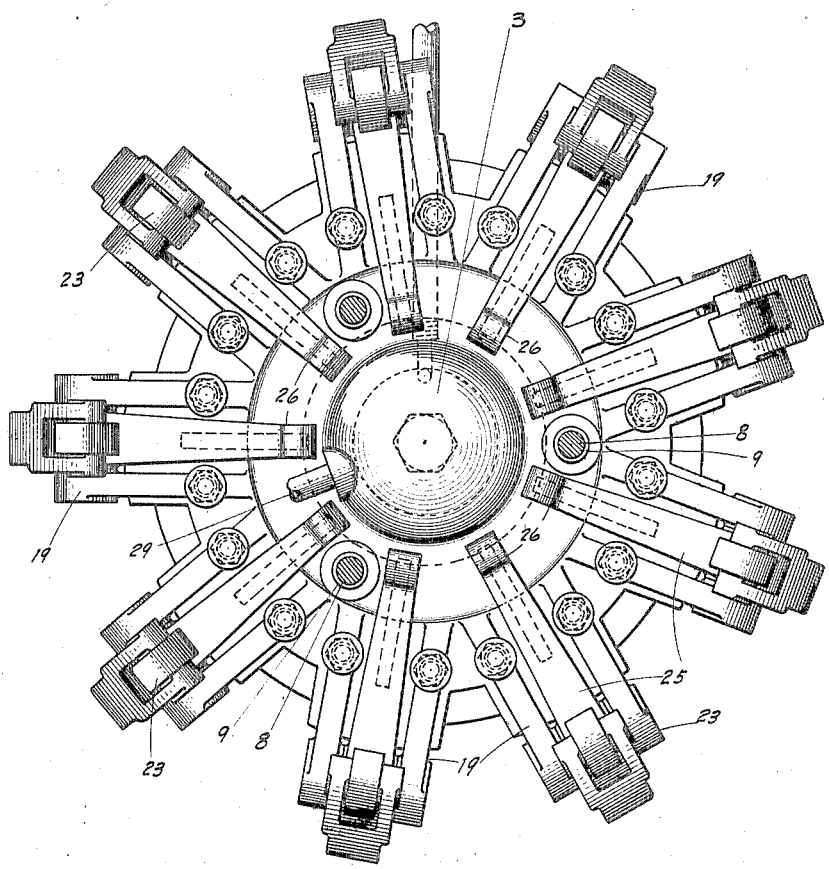

UNITED STATES PATENT OFFICE.

CHARLES W. STEELE, OF AKRON, OHIO, ASSIGNOR TO THE FIRESTONE TIRE AND RUBBER COMPANY, OF AKRON, OHIO, A CORPORATION OF OHIO.

TREAD-FORMING PRESS.

1,291,227.      Specification of Letters Patent.      Patented Jan. 14, 1919.

Application filed May 27, 1918. Serial No. 236,700.

*To all whom it may concern:*

Be it known that I, CHARLES W. STEELE, a citizen of the United States, residing at Akron, in the county of Summit, State of Ohio, have invented certain new and useful Improvements in Tread-Forming Presses, of which the following is a specification.

This invention relates to vulcanizers for articles manufactured of rubber, and more particularly to apparatus for molding or partially vulcanizing the tread strips of pneumatic tire casings. It has formerly been the practice to form these tread strips on drums provided with configuration similar to that on the finished tire carcass, from a ring of uncured rubber which was subsequently tightly wrapped with cloths and then cured. When cured and unwrapped, the tread band was turned inside out and placed on the unfinished or partially vulcanized tire casing and cured thereon.

It is the purpose of this invention to construct a press in which these tread bands may be cured quicker and better than is now done.

Although I have shown one embodiment of my invention in great detail, it is not necessary that the details be followed, as changes may be made within the scope of the invention.

Fig. 2 is a plan view.

Fig. 3 is a horizontal section taken directly under the mold plate.

Figure 1:
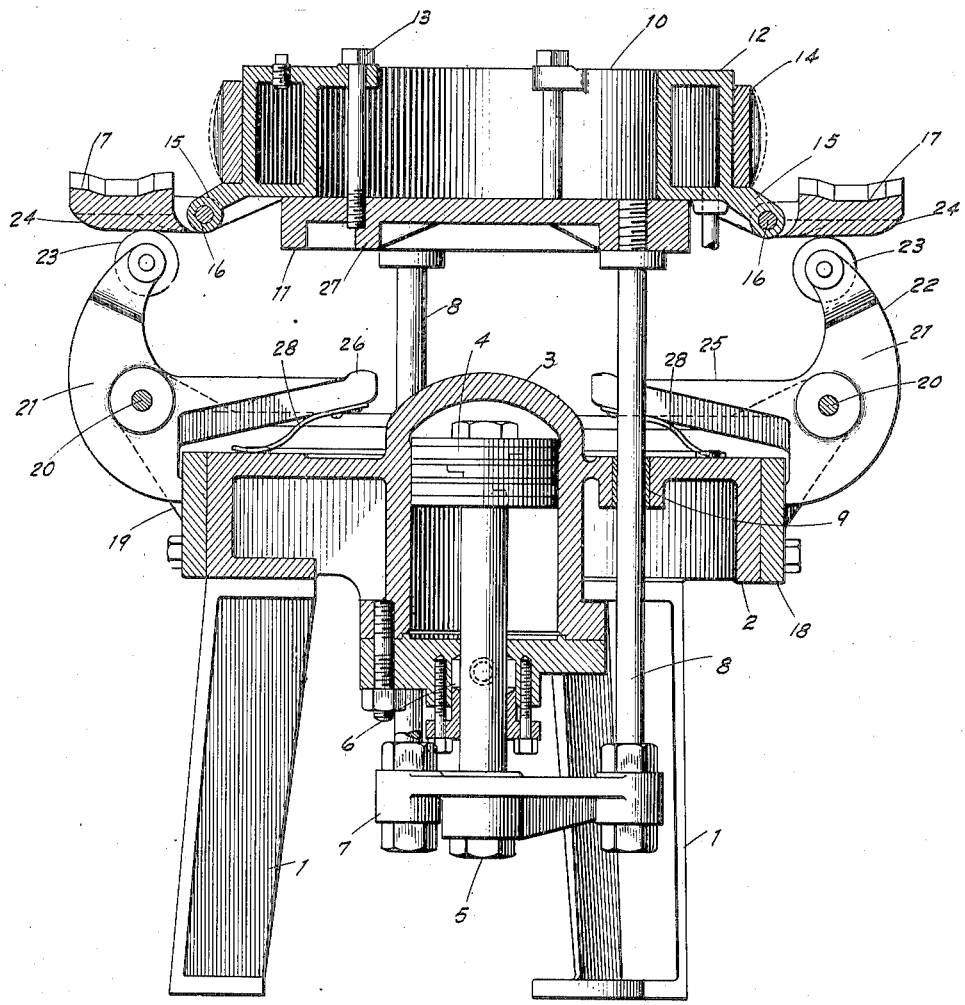
Figure 1 is a vertical section through the press showing it open.

The press is mounted on legs or standard 1 supporting a table 2 in the central portion of which is formed a cylinder 3 having a vertically reciprocating piston 4 designed to operate the parts of the press. The piston rod 5 extends through a packing 6 in the lower part of the cylinder and carries a cross-head or yoke 7, the arms of which carry vertical rods 8 carrying the platen from the press. The rods pass through and are guided by bushings 9 on the upper surface of the table 2.

The platen is movable by the means described and is designated generally by the numeral 10 comprising a supporting plate 11 mounted on the upper ends of the rods 8 and a circular steam chest 12 in which the steam for vulcanizing is circulated, the steam chest being secured to the supporting plate 11 by bolts 13. Around the outside of the steam chest 12 is placed a circular form, or mold, 14, the outer surface of which is cut to the shape desired for a tread strip.

From the lower outside edge of the steam chest extend a series of radial brackets 15 having at their outer ends pivot pins 16 upon which are arranged to be mounted plates 17 which are curved in the arcs of a circle concentric with the form and adapted when all brought together to inclose the article to be vulcanized and firmly press it to such an extent that it will be formed to correspond to the tread design.

On the table 2 is mounted a ring 18 having formed therewith a series of brackets 19 at the outer ends of which are pivots 20 carrying the abutting members intended to close both plates together in a manner to be described by the abutting plates and indicated by the numeral 21. They are in the form of right angle levers, one arm extending upward as at 22 and carrying a roller 23 forming a rest for the pivoted plates 17 and bearing on the cam track 24 formed centrally on the outside of its pivoted plate. The other arm of the abutment is indicated at 25 and extends horizontally under the platen and over the top of the table, the extreme end of the arm being formed with shoulder 26 in the path of the circular rib 27 formed on the underside of the plate. Leaf springs 28 are secured to the underside of the arms 25 and bear against the top of the table serving to maintain the abutments in the positions shown in Fig. 1.

The device is operated as follows:

A suitable form 14 having been placed around the steam chest, a band of uncured rubber is placed around the form and fluid under pressure applied to the upper part of the cylinder 3 through the pipe 29, and the piston is forced downward in the cylinder drawing the platen with the form between the abutments. The rollers 23 riding on the cam tracks 24 bring the plates 17 together around the rubber. As the plates reach the lower limit of their movement, the shoulders 26 are contacted by the rib 27 and the plates are given a final squeeze which serves to force the rubber into the cavities on the form. Steam being admitted to the steam chest, the press remains in the closed position until the tread band is cured, when it is opened up by a reverse movement of the piston and the tread band removed.

While I have shown plates 17 as solid, it may be preferable to hollow these out and provide additional steam connections for curing the outside of the tread bands. Other modifications may suggest themselves to those skilled in the art and it is not my intention to be confined to the design shown herein.

I claim:

1. In a press for vulcanizing, the combination of a circular form upon which the unvulcanized article is placed, a series of plates in the arcs of a circle pivotally mounted adjacent the form, means to rock the plates on their pivots to form a complete circle around the article and to press the plates together, to exert curing pressure thereon.

2. In a press for vulcanizing, the combination of a circular form upon which the unvulcanized article is placed, a series of pivots arranged about and below the form, plates in arcs of a circle mounted to rock on the pivots, the upper faces of the plates when in their lower-most position lying below the form, means to rock the plates upwardly to form a complete circle about the form and to press the plates together to exert curing pressure on the article.

3. In a press for vulcanizing, the combination of a circular platen, a form on said platen, a series of plates in the arcs of a circle pivotally mounted adjacent the form, a series of abutments located around the forms and adapted to contact the plates, means to cause relative movement between the platen and the abutments to rock the plates on their pivots to form a complete circle around the form.

4. In a press for vulcanizing, the combination of a circular platen, a form on said platen, a series of plates in the arcs of a circle pivotally mounted adjacent the form, a series of abutments located around the forms and adapted to contact the plates, means to cause relative movement between the platen and the abutments to rock the plates on their pivots to form a complete circle about the form, and means to give the plates an increment of pressure at the point of closing.

5. In a press for vulcanizing, the combination of a circular platen, a form on said platen, a series of plates in the arcs of a circle pivotally mounted adjacent the form and carried by the platen, a series of abutments contacting the plates and relatively stationary thereto, and means for moving the platen between the abutments.

6. In a press for vulcanizing, the combination of a circular platen, a form on said platen, a series of plates in the arcs of a circle pivotally mounted adjacent the form and carried by the platen, a table below the platen, a series of abutments contacting the plates, pivotal mounting for said abutments on the table, means for moving the platen between the abutments, and additional means for rocking the abutments at the limit of movement of the platen to give the plates an increment of pressure at the point of closing.

7. In a press for vulcanizing, the combination of a circular platen, a form on said platen, a series of plates in the arcs of a circle pivotally mounted adjacent the form and carried by the platen, a table below the platen, a series of abutments pivoted on the table, means for moving the platen between the abutments, an arm on each said abutment contacting one of said plates, a second arm on said abutment projecting beneath the platen and adapted to be rocked by it at the limit of its downward movement.

CHARLES W. STEELE.